(12) United States Patent
Ishikawa et al.

(10) Patent No.: US 11,040,589 B2
(45) Date of Patent: Jun. 22, 2021

(54) WORK VEHICLE

(71) Applicant: KUBOTA CORPORATION, Osaka (JP)

(72) Inventors: Junichi Ishikawa, Osaka (JP); Minoru Hiraoka, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 56 days.

(21) Appl. No.: 16/466,456

(22) PCT Filed: Oct. 31, 2017

(86) PCT No.: PCT/JP2017/039350
§ 371 (c)(1),
(2) Date: Jun. 4, 2019

(87) PCT Pub. No.: WO2018/116642
PCT Pub. Date: Jun. 28, 2018

(65) Prior Publication Data
US 2019/0389268 A1   Dec. 26, 2019

(30) Foreign Application Priority Data

Dec. 22, 2016 (JP) .............................. JP2016-249937
Dec. 22, 2016 (JP) .............................. JP2016-249938

(51) Int. Cl.
*B60G 17/015* (2006.01)
*B60K 7/00* (2006.01)
(Continued)

(52) U.S. Cl.
CPC .......... *B60G 17/015* (2013.01); *B60K 7/0015* (2013.01); *B62D 61/12* (2013.01); *B60G 17/0165* (2013.01); *B60K 2007/0038* (2013.01)

(58) Field of Classification Search
CPC .............. B60G 17/015; B60G 17/0165; B60K 2007/0038
See application file for complete search history.

(56) References Cited

U.S. PATENT DOCUMENTS 4,102,424 A   7/1978 Heinze et al.
4,273,306 A   6/1981 Chang et al.
(Continued)

FOREIGN PATENT DOCUMENTS

DE   297 12 694 U1   9/1997
JP   55-26988   2/1980
(Continued)

OTHER PUBLICATIONS

Official Communication issued in International Application No. PCT/JP2017/039350, dated Jan. 16, 2018.
(Continued)

*Primary Examiner* — Faye M Fleming
(74) *Attorney, Agent, or Firm* — Greenblum & Bernstein, P.L.C.

(57) ABSTRACT

A work vehicle includes: a vehicle body; a plurality of traveling devices located on both right and left sides of the vehicle body; a plurality of bending link mechanisms that support the respective traveling devices on the vehicle body such that the traveling devices can be individually raised or lowered; and a plurality of drive mechanisms capable of individually changing the posture of the bending link mechanisms. The drive mechanisms change the posture of the bending link mechanisms while maintaining a state in which intermediate bending portions of the bending link mechanisms bend toward an intermediate side in a front-rear direction of the vehicle body.

15 Claims, 6 Drawing Sheets

(51) Int. Cl.
*B60G 17/0165* (2006.01)
*B62D 61/12* (2006.01)

(56) References Cited

U.S. PATENT DOCUMENTS

| | | | |
|---|---|---|---|
| 5,390,752 | A | 2/1995 | Urbanczyk |
| 5,515,934 | A | 5/1996 | Davis et al. |
| 6,206,125 | B1 | 3/2001 | Weddle et al. |
| 6,311,795 | B1 | 11/2001 | Skotnikov et al. |
| 2015/0291233 | A1 | 10/2015 | Dames et al. |
| 2017/0043818 | A1 | 2/2017 | Moriguchi et al. |
| 2020/0017152 | A1* | 1/2020 | Ishikawa .................. B25J 5/00 |
| 2020/0062324 | A1* | 2/2020 | Ishikawa ................ B62D 61/10 |

FOREIGN PATENT DOCUMENTS

| | | |
|---|---|---|
| JP | 74907/1989 | 5/1989 |
| JP | 4-197881 | 7/1992 |
| JP | 7-276951 | 10/1995 |
| JP | 9-142347 | 6/1997 |
| JP | 9-315127 | 12/1997 |
| JP | 2003-136930 | 5/2003 |
| JP | 2009-214713 | 9/2009 |
| JP | 2014-234138 | 12/2014 |
| JP | 2015-120376 | 7/2015 |
| JP | 2015-209137 | 11/2015 |

OTHER PUBLICATIONS

Official Action dated Jun. 2, 2020 in corresponding Japanese priority application No. 2016-249938.
Extended European Search Report issued on European Patent Application No. 17883079.0 dated Aug. 10, 2020.

* cited by examiner

WORK VEHICLE

TECHNICAL FIELD

The present invention relates to a work vehicle suitable for traveling on uneven terrain. In the present invention, the term "work vehicle" includes a hydraulic robot suitable for traveling on uneven terrain.

BACKGROUND ART

In a conventional configuration, four traveling wheels are respectively supported on a vehicle body through link mechanisms configured with two joints and capable of bending/extending operation. Each link mechanism includes an electric motor, a speed reduction mechanism and the like, and is capable of driving to bend/extend under the driving force of the electric motor (see Patent Literature 1, for example).

PRIOR ART

Patent Literatures

Patent Literature 1: JP 9-142347 A

SUMMARY OF THE INVENTION

Object to be Achieved by the Invention

With the wheel support structure in the above-described conventional configuration, it is possible to travel with the vehicle body maintained in an appropriate posture while bending and extending the link mechanisms, even when the traveling road surface is uneven. Therefore, it is conceivable to apply such a wheel support structure to an agricultural work vehicle that travels at a work site having irregularities on the traveling road surface. However, the wheel support structure in the above-described conventional configuration has been difficult to adopt in an agricultural work vehicle for the reasons described below.

[1] First, in the above-described conventional configuration, when performing an operation to change the posture of a bending (flexion) link mechanism, the operation is performed in a state in which an intermediate bending portion of the bending link mechanism bends toward the outside in the front-rear direction of the vehicle body. However, in this configuration, the bending link mechanism protrudes to the outside from the vehicle body, and the front-rear length of the vehicle body becomes long. Also, there is a risk that at the location where the bending link mechanism protrudes, the bending link mechanism will contact a crop planted in the field and damage the crop.

Consequently, there has been a demand for a work vehicle that is capable of maintaining an appropriate posture of the vehicle body even at a work site with much irregular terrain, while adopting a compact configuration.

[2] Also, with an agricultural work vehicle, a lot of fine dust, such as dust generated by traveling or floating dust generated from the crop due to harvesting work, may be generated in the vicinity of the work vehicle. Also, moisture may adhere due to rain water, morning dew or the like. In the above-described conventional configuration, because the link mechanism for supporting the traveling wheels is driven to bend or extend by a built-in electric motor, when fine dust, moisture or the like intrude inside the link mechanism, there is a risk that a malfunction may occur in the electric motor, the speed reduction mechanism or the like.

Consequently, in work environments where there is a significant risk that fine dust, moisture or the like will intrude, there has been a demand for a robot that is capable of maintaining an appropriate posture of the robot body even at a work site with much irregular terrain.

Solution for Achieving the Object

[A] The problems in [1] are addressed as described below.

In a characteristic configuration of a work vehicle according to the present invention, the work vehicle includes: a vehicle body; a plurality of traveling devices located on both right and left sides of the vehicle body; a plurality of bending link mechanisms that support the respective traveling devices on the vehicle body such that the traveling devices can be individually raised or lowered; and a plurality of drive mechanisms capable of individually changing the posture of the bending link mechanisms. The drive mechanisms are able to change the posture of the bending link mechanisms while maintaining a state in which intermediate bending portions of the bending link mechanisms bend toward an intermediate side in a front-rear direction of the vehicle body.

According to this configuration, the plurality of traveling devices are supported such that they can be individually raised or lowered relative to the vehicle body by the bending link mechanisms. By changing the posture of the bending link mechanisms with the drive mechanisms, it is possible to change the height (relative height) of each of the plurality of traveling devices with respect to the vehicle body. In other words, it is possible to change the relative height of the traveling devices provided on both right and left sides of the vehicle body.

For example, in a case where the ground corresponding to any of the installation locations of the plurality of traveling devices is low, and the ground corresponding to another installation location is high, by lowering the relative height of the traveling device at the location where the ground is low, and raising the relative height of the traveling device at the other location, the vehicle body can be maintained in an appropriate posture in a state where the plurality of traveling devices are in contact with the ground. As a result, even when traveling on uneven ground, it is possible to travel in a state with the vehicle body maintained in an appropriate posture while being supported in a stably grounded manner by the plurality of traveling devices.

Also, in this configuration, it is possible to change the posture of the bending link mechanisms while maintaining a state in which intermediate bending portions of the bending link mechanisms bend toward an intermediate side in a front-rear direction of the vehicle body. According to this configuration, the bending link mechanisms do not protrude to the outside in the front-rear direction from the vehicle body, so that the length in the front-rear direction of the vehicle body can be made more compact, and therefore there is less risk that the bending link mechanism will contact a crop planted in the field and damage the crop. Here, the description "it is possible to change the posture of the bending link mechanisms while maintaining a state in which intermediate bending portions of the bending link mechanisms bend toward an intermediate side in a front-rear direction of the vehicle body" does not exclude a configuration in which, in addition to a state in which intermediate bending portions of the bending link mechanisms bend toward an intermediate side in a front-rear direction of the vehicle body, another state is possible, such as a state in which the intermediate bending portions bend toward the outside in the front-rear direction of the vehicle body. In other words, the technical scope of the present invention also encompasses, for example, a configuration in which, when traveling in an ordinary manner, while maintaining a state in which intermediate bending portions of the bending link mechanisms bend toward the intermediate side in a front-rear direction of the vehicle body, traveling is performed while changing the posture of the bending link mechanisms, and when climbing over a step, the intermediate bending portion of at least any of the bending link mechanisms bends toward the outside in the front-rear direction of the vehicle body.

In a suitable embodiment, each of the bending link mechanisms includes a first link having one end supported on the vehicle body such that the first link is capable of swinging around a lateral axis, and a second link having one end supported on the other end of the first link such that the second link is capable of swinging around a lateral axis, with the traveling device supported on the other end of the second link, each of the drive mechanisms includes a first cylinder capable of changing the swinging posture of the first link with respect to the vehicle body, and a second cylinder capable of changing the swinging posture of the second link with respect to the first link, and each of the drive mechanisms changes the posture of the bending link mechanism while maintaining a state in which the first link and the second link in the bending link mechanism bend toward the intermediate side in the front-rear direction of the vehicle body.

According to this configuration, each of the bending link mechanisms is configured with the first link and the second link connected such that they can swing around a lateral axis, and by changing the swinging posture of the first link with respect to the main body with the first cylinder, and changing the swinging posture of the second link with respect to the first link with the second cylinder, the posture of the bending link mechanism is changed. When changing the posture of the bending link mechanism in this way, a state is maintained in which the first link and the second link bend toward the intermediate side in the front-rear direction of the vehicle body.

Because the first link and the second link bend toward the intermediate side in the front-rear direction of the vehicle body in this way, the bending link mechanism does not protrude to the outside along the front-rear direction of the vehicle body, so that there is little risk that the bending link mechanism will contact a planted crop and damage the crop.

In a suitable embodiment, the drive mechanisms are hydraulically driven drive mechanisms.

Operation to change the posture of the bending link mechanism is possible using, for example, a hydraulically driven drive mechanism configured from a hydraulic cylinder or the like. A hydraulically driven drive mechanism ordinarily has water-proof and dust-proof properties. Therefore, even if moisture or dust adheres to the surface of the drive mechanism, these can be prevented from entering into the drive mechanism, and as a result, it is unlikely that the drive mechanism will be adversely affected by that moisture or dust and malfunction, for example.

Accordingly, it is possible to obtain a work vehicle that, in a work environment where there is a significant risk that fine dust, moisture, or the like will intrude into the vehicle, is capable of traveling while maintaining an appropriate posture of the vehicle body even at a work site with much irregular terrain.

In a suitable embodiment, in the vehicle body, there is provided a hydraulic supply source that feeds out hydraulic oil toward the plurality of drive mechanisms, and the hydraulic supply source is mounted on and supported by a base that supports the entire vehicle in the vehicle body.

According to this configuration, hydraulic oil is fed out from the hydraulic supply source to the plurality of hydraulically driven drive mechanisms. The drive mechanisms require a large amount of hydraulic oil, so that the hydraulic supply source is a large device. Therefore, the hydraulic supply source is mounted on and supported by a base. The base is a rigid component that supports the entire vehicle, and can stably support the hydraulic supply source, which is a large device.

In a suitable embodiment, a plurality of hydraulic motors that individually drive each traveling device are provided.

According to this configuration, the plurality of traveling devices are individually driven by the hydraulic motors. The hydraulic motors ordinarily have water-proof and dust-proof properties. Therefore, even if moisture or dust adheres to the surface of the hydraulic motors, these can be prevented from entering into the hydraulic motors, and as a result, it is unlikely that the hydraulic motors will be adversely affected by that moisture or dust and malfunction, for example.

Instead of hydraulic motors, for example, a configuration is also conceivable in which the traveling devices are driven using a mechanical transmission mechanism such as a chain transmission mechanism, but with this configuration, between the traveling devices and a drive source such as an engine provided in the vehicle body, along the bending link mechanisms, it is necessary to provide a transmission mechanism capable of power transmission while allowing bending operation of the bending link mechanisms, and therefore the structure becomes complicated. On the other hand, with the configuration of the present invention, the structure is simplified in comparison to that sort of mechanical transmission structure.

In a suitable embodiment, a plurality of auxiliary wheels are provided in a lower portion of the vehicle body.

For example, when the work vehicle is in a non-working state or the like and is moved in order to be loaded onto a truck, if the traveling device is grounded, rotation is blocked by a drive device such as a hydraulic motor, so that the work vehicle cannot be moved.

Consequently, in this configuration, the plurality of auxiliary wheels are provided in a lower portion of the vehicle body. By adopting this sort of configuration, when the auxiliary wheels are grounded in a state in which the traveling devices have been raised by folding the plurality of bending link mechanisms upward, it is possible to easily move the work vehicle by a manual operation.

Moreover, in a state in which the traveling devices have been stored by folding the bending link mechanisms upward, for example when the work vehicle is lowered from a loading platform of the truck, the auxiliary wheels make first contact with the ground, so that it is possible to prevent damage to the vehicle by absorbing an impact when the work vehicle makes contact with the ground.

Furthermore, work vehicles with the following configurations are also suitable (effects exhibited by each configuration will be described later in [B]).

A work vehicle in which the traveling devices and the drive mechanisms are hydraulically driven,
the work vehicle including a hydraulic supply source that feeds out hydraulic oil toward the traveling devices and the drive mechanisms, and a valve mechanism that controls hydraulic oil supplied from the hydraulic supply source to the drive mechanisms.

A work vehicle in which the hydraulic supply source includes a hydraulic pump and a power device that drives the hydraulic pump.

A work vehicle in which hydraulic motors that drive the traveling devices are provided individually in the traveling devices.

A work vehicle in which the vehicle body includes a support base that extends upward from a base so as to straddle the hydraulic supply source, and a control device that controls operation of the valve mechanism, the control device being supported on an upper portion of the support base, and the valve mechanism being supported on upper-lower intermediate portions of the support base.

[B] The problems in [2] are addressed as described below.

In a characteristic configuration of a hydraulic robot according to the present invention, the hydraulic robot includes: a main body; a plurality of hydraulically driven traveling devices located on both right and left sides of the main body; a plurality of raising/lowering support mechanisms that support the respective traveling devices on the main body such that the traveling devices can be individually raised or lowered; a plurality of hydraulically driven drive mechanisms capable of individually changing the posture of the raising/lowering support mechanisms; a hydraulic supply source that feeds out hydraulic oil toward the traveling devices and the drive mechanisms; and a valve mechanism that controls hydraulic oil supplied from the hydraulic supply source to the drive mechanisms.

According to this configuration, it is possible to change the height (relative height) of each of the plurality of traveling devices with respect to the main body.

For example, in a case where the ground corresponding to any of the installation locations of the plurality of traveling devices is low, and the ground corresponding to another installation location is high, by lowering the relative height of the traveling device at the location where the ground is low, and raising the relative height of the traveling device at the other location, the main body can be maintained in an appropriate posture in a state where the plurality of traveling devices are in contact with the ground. As a result, even when traveling on uneven ground, it is possible to travel in a state with the main body maintained in an appropriate posture while being supported in a stably grounded manner by the plurality of traveling devices.

Operation to change the posture of the raising/lowering support mechanism is possible using, for example, a hydraulically driven drive mechanism configured from a hydraulic cylinder or the like. A hydraulically driven drive mechanism ordinarily has water-proof and dust-proof properties. Therefore, even if moisture or dust adheres to the surface of the drive mechanism, these can be prevented from entering into the drive mechanism, and as a result, it is unlikely that the drive mechanism will be adversely affected by that moisture or dust and malfunction, for example.

Accordingly, it is possible to obtain a work vehicle that, in a work environment where there is a significant risk that fine dust, moisture, or the like will intrude into the vehicle, is capable of traveling while maintaining an appropriate posture of the vehicle body even at a work site with much irregular terrain.

In a suitable embodiment, the hydraulic supply source includes a hydraulic pump and a power device that drives the hydraulic pump.

According to this configuration, it is possible to suitably configure the hydraulic supply source.

In a suitable embodiment, hydraulic motors that drive the traveling devices are provided individually in the traveling devices.

According to this configuration, the plurality of traveling devices are individually driven by hydraulic motors. The hydraulic motors ordinarily have water-proof and dust-proof properties. Therefore, even if moisture or dust adheres to the surface of the hydraulic motors, these can be prevented from entering into the hydraulic motors, and as a result, it is unlikely that the hydraulic motors will be adversely affected by that moisture or dust and malfunction, for example.

Instead of hydraulic motors, for example, a configuration is also conceivable in which the traveling devices are driven using a mechanical transmission mechanism such as a chain transmission mechanism, but with this configuration, between the traveling devices and a drive source such as an engine provided in the main body, along the bending link mechanisms, it is necessary to provide a transmission mechanism capable of power transmission while allowing bending operation of the bending link mechanisms, and therefore the structure becomes complicated. On the other hand, with the configuration of the present invention, the structure is simplified in comparison to that sort of mechanical transmission structure.

In a suitable embodiment, the main body includes a support base that extends upward from a base so as to straddle the hydraulic supply source, and a control device that controls operation of the valve mechanism, the control device being supported on an upper portion of the support base, and the valve mechanism being supported on upper-lower intermediate portions of the support base.

According to this configuration, because the control device is provided at a high location in the upper portion of the support base, for example, when performing work to harvest a crop using this work vehicle, there is less risk that moisture adhering to the crop, fine dust generated from the crop, or the like will fall onto the control device and adversely affect the control device, or that other such problems will occur.

On the other hand, because the valve mechanism is supported on the upper-lower intermediate portions of the support base, while shortening the control wiring between the control device and the valve mechanism as much as possible, it is possible to shorten the hydraulic piping from the hydraulic oil supply device to the valve mechanism, and the hydraulic piping from the valve mechanism to the drive mechanism.

In a suitable embodiment, the raising/lowering support mechanisms are bending link mechanisms.

According to this configuration, with bending links, it is possible to suitably support the main body such that the main body can be raised or lowered.

In a suitable embodiment, each of the bending link mechanisms includes a first link having one end supported on the main body such that the first link is capable of swinging around a lateral axis, and a second link having one end supported on the other end of the first link such that the second link is capable of swinging around a lateral axis, with the traveling device supported on the other end of the second link, and each of the drive mechanisms includes a first hydraulic cylinder capable of changing the swinging posture of the first link with respect to the main body, and a second hydraulic cylinder capable of changing the swinging posture of the second link with respect to the first link.

According to this configuration, each of the bending link mechanisms is configured with the first link and the second link connected such that they can swing around a lateral axis, and by changing the swinging posture of the first link with respect to the main body with the first hydraulic cylinder, and changing the swinging posture of the second link with respect to the first link with the second hydraulic cylinder, the posture of the bending link mechanism is changed. With such a configuration in which two hydraulic cylinders are used to individually change the swinging posture of two links that are pivotally connected, an posture changing operation can be smoothly performed.

Other characteristic configurations and advantageous effects obtained therefrom will be apparent from the following description with reference to the accompanying drawings.

DETAILED DESCRIPTION OF PREFERRED EMBODIMENTS

An embodiment of a work vehicle according to the present invention will be described below with reference to the drawings. In the present embodiment, a hydraulic robot is disclosed as an example of a work vehicle, but the hydraulic robot will be referred to as a "work vehicle" in the following description.

Also, in the following description, the right side in FIGS. 1 and 2 corresponds to the front side of the vehicle body of the work vehicle, and the left side in FIGS. 1 and 2 corresponds to the rear side of the vehicle body of the work vehicle.

Figure 1:
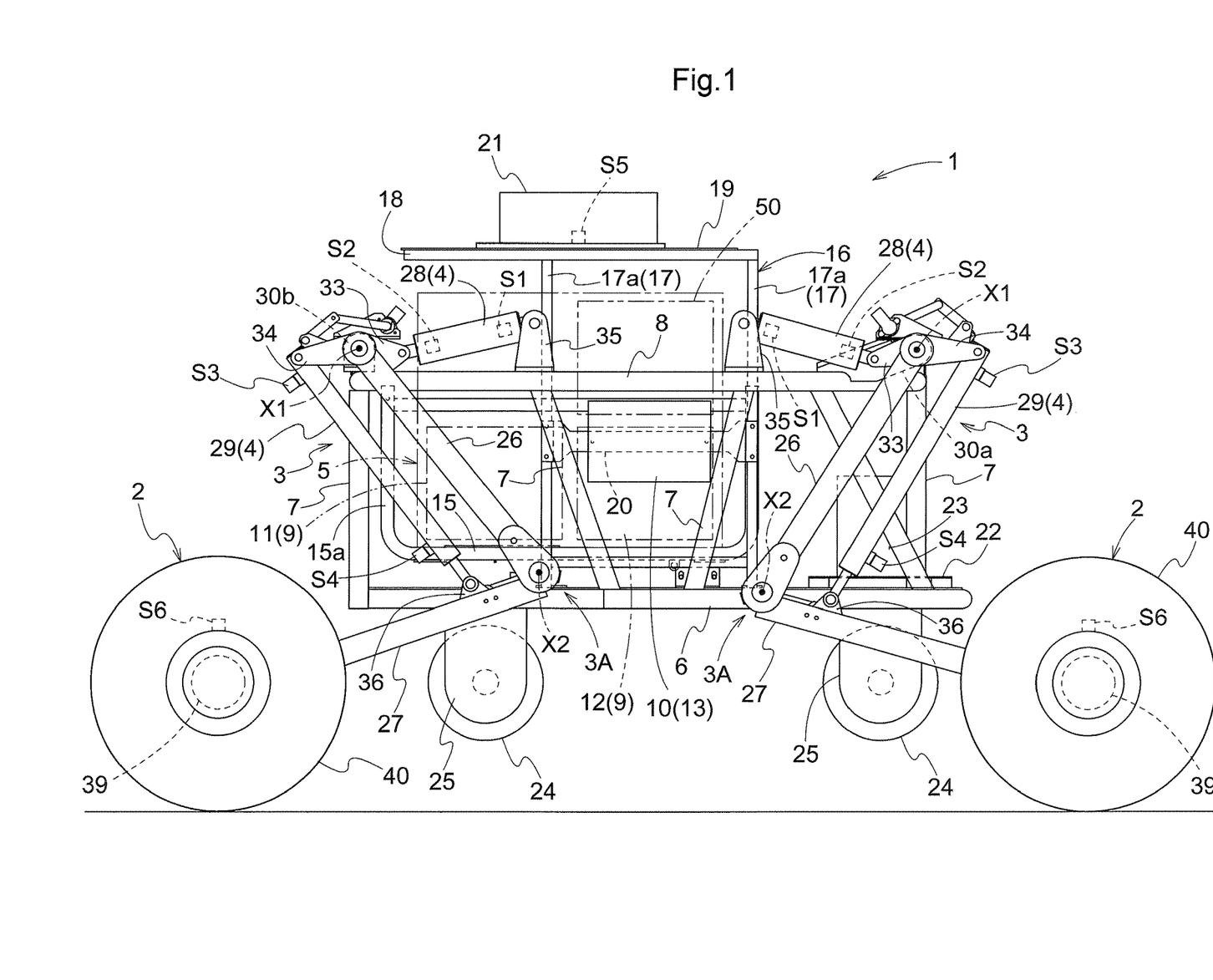
FIG. 1 shows an embodiment of the present invention, and is a side view of a hydraulic robot serving as one example of a work vehicle.
Figure 2:
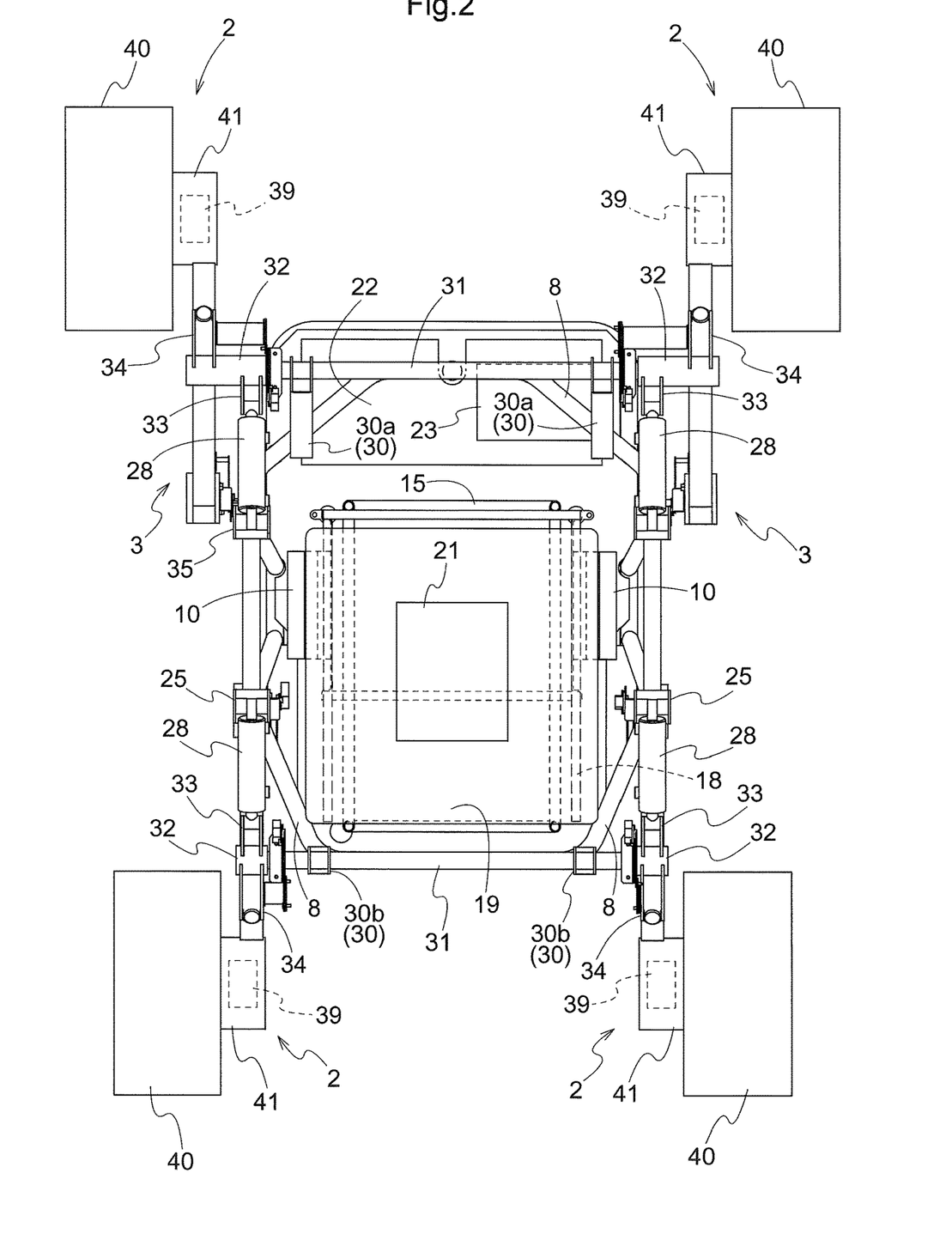
FIG. 2 shows a plan view of the work vehicle.
Figure 3:
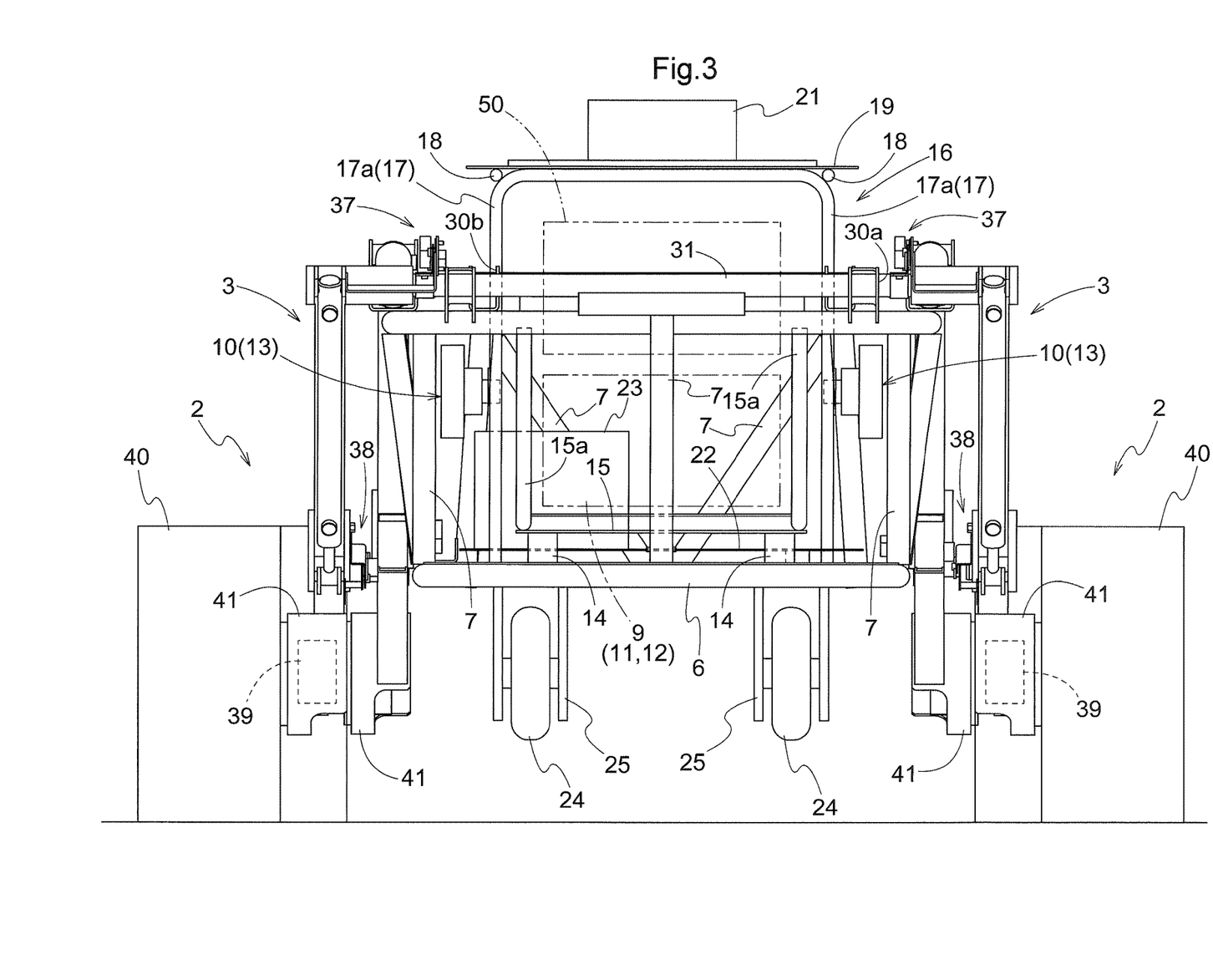
FIG. 3 shows a front view of the work vehicle.

As shown in FIGS. 1 to 3, the work vehicle has a substantially rectangular frame-like vehicle body 1 (simply referred to as a "main body 1" hereinafter) that supports the entire vehicle, a plurality of (four in more specific) traveling devices 2 located at the front and rear respectively on both right and left sides of the vehicle body 1, a plurality of bending (flexion) link mechanisms 3 (serving as an example of a raising/lowering support mechanism) that support the respective traveling devices 2 on the main body 1 such that it is possible to individually raise or lower the traveling devices 2, a plurality of hydraulically driven drive mechanisms 4 capable of individually changing the posture of the plurality of bending link mechanisms 3, and a hydraulic oil supply device 5 that supplies hydraulic oil to the drive mechanisms 4.

The main body 1 includes a plate-like base 6 that supports the entire body of the vehicle and supports a bottom portion of the main body 1, and a plurality of frame members 7 that extend upward from a plurality of appropriately dispersed locations along a peripheral edge portion of the base 6. The frame members 7 are formed in a state extending upward from locations corresponding to each of the plurality of traveling devices 2. Upper portions of the plurality of frame members 7 are connected to each other by an upper connecting body 8. The upper connecting body 8 is formed in a ring shape extending along the outer peripheral portion of the base 6. In this way, the upper and lower sides of the plurality of frame members 7 are integrally connected to each other to thereby constitute a rigid frame member. Therefore, in the main body 1, a bottom portion is formed by the plate-like base 6, and a framework is formed by the plurality of frame members 7 and provided in an approximately box-like shape having an open top.

The hydraulic oil supply device 5 includes a hydraulic supply source 9 that feeds out hydraulic oil toward the drive mechanisms 4, and valve mechanisms 10 that control the hydraulic oil supplied from the hydraulic supply source 9 to the drive mechanisms 4. More specifically, although not described in detail, the hydraulic supply source 9 includes an engine 11 (serving as an example of a power device that drives a hydraulic pump) and a hydraulic pump 12 driven by the engine 11, which are integrally connected to each other. Hydraulic oil is fed out and supplied to the drive mechanisms 4 through the valve mechanisms 10 by the hydraulic pump 12, which is driven by the engine 11. The valve mechanisms 10 include a plurality of hydraulic control valves 13 that perform supply/discharge of hydraulic oil to/from the drive mechanisms 4, or adjustment of a flow rate or the like.

The hydraulic oil supply device 5 is provided in the main body 1 at an intermediate location in the front-rear direction of the vehicle body.

The hydraulic pressure supply source 9 constituting a main part of the hydraulic oil supply device 5 is mounted on and supported by the base 6 in a state located in the main body 1 at an intermediate location in the front-rear direction of the vehicle body. As shown in FIG. 3, an engine support frame 15 is supported on the base 6 through an anti-vibration member 14. The hydraulic pressure supply source 9 is mounted on and supported by the engine support frame 15. Because the engine support frame 15 is supported in an anti-vibration manner, vibration of the engine 11 is less likely to be transmitted to the base 6. Further, the engine support frame 15 includes vertical frame portions 15a at locations on both right and left sides in both front and rear side portions, and is capable of protecting the hydraulic supply source 9 when, for example, the vehicle body rolls over.

As shown in FIGS. 1 and 3, the main body 1 includes a support base 16 that extends upward from the base 6 so as to straddle the hydraulic supply source 9 in the vicinity of an intermediate portion in the front-rear direction. The support base 16 includes a pair of front and rear gate-shaped members 17 formed in a gate-like shape in a front view so as to straddle the hydraulic supply source 9 with a space between the gate-shaped members 17 in the front-rear direction, a right-left pair of front-rear oriented connecting members 18 that connect upper end portions of the front-rear pair of gate-shaped members 17 to each other on both right and left sides, and a mounting base 19 supported on the upper side of the right-left connecting members 18. Lower ends of the front-rear pair of gate-shaped members 17 are fixed to the base 6.

The valve mechanisms 10 are supported on the upper-lower intermediate portions of the support base 16. That is, as shown in FIG. 1, a support bracket 20 is provided spanning across upper-lower intermediate portions of a front side vertical portion 17a of the gate-shaped member 17 and upper-lower intermediate portions of a rear side vertical portion 17a of the gate-shaped member 17. As shown in FIG. 3, support brackets 20 are provided on both right and left sides of the support base 16, and the valve mechanisms 10 are individually attached to the support brackets 20 on both right and left sides respectively.

Therefore, the hydraulic supply source 9 and the valve mechanisms 10 that constitute the hydraulic oil supply device 5 are provided in the main body 1 at an intermediate location in the front-rear direction of the vehicle body.

Also, a hydraulic oil tank 50 is disposed in the main body 1 above the intermediate location in the front-rear direction of the vehicle body, that is, above the hydraulic supply source 9 and the valve mechanisms 10 that constitute the hydraulic oil supply device 5. By disposing the hydraulic oil tank 50 above and the hydraulic oil supply device 5 in the open space below in this way, the hydraulic supply source 9 and the valve mechanisms 10 that constitute the hydraulic oil supply device 5 are located at a comparatively lower location in the main body 1, so that air is unlikely to enter the hydraulic supply source 9 and the valve mechanisms 10, and therefore it is possible to stabilize hydraulic control. Note that, in a case where lowering of the center of gravity of the vehicle is emphasized, a configuration may be adopted in which the hydraulic oil tank 50 is disposed in the main body 1 below the intermediate location in the front-rear direction of the vehicle body, and the hydraulic supply source 9 and the valve mechanisms 10 that constitute the hydraulic oil supply device 5 are disposed above the hydraulic oil tank 50.

As shown in FIGS. 1, 2 and 3, a control device 21 that controls operation of the valve mechanisms 10 is mounted on and supported by the mounting base 19 provided in the upper end portion of the support base 16. Although the control operation of the control device 21 is not described in detail, the control device 21 controls the state of supply of hydraulic oil to the drive mechanisms 4 in the valve mechanisms 10 based on control information inputted by a manual input device (not shown) or control information that has been set in advance and stored. A battery 23 is mounted and supported, through a dedicated mounting base 22, at a location on the front side of the vehicle body in the base 6. Power can be supplied to the control device 21 by the battery 23.

A plurality of auxiliary wheels 24 are provided below the main body 1. That is, as shown in FIGS. 1 and 3, on the lower face side of the base 6, a total of four auxiliary wheels 24 are provided in a state disposed in a dispersed manner at locations on both right and left sides in each of both front and rear side portions of the vehicle. A support bracket 25 is attached in a state protruding downward from the lower face of the base 6, and the auxiliary wheels 24 are supported on the support bracket 25 so as to be freely rotatable around a lateral axis. By providing such auxiliary wheels 24, for example, all of the traveling devices 2 can easily be moved manually by storing the traveling devices 2 upward as indicated by the virtual line in FIG. 4.

Next is a description of the support structure for supporting the traveling devices 2 on the main body 1.

Each of the plurality (four in more specific) of bending link mechanisms 3 includes a first link 26 having one end supported on the main body 1 such that the first link 26 is capable of swinging around a lateral axis, and a second link 27 having one end supported on the other end of the first link 26 such that the second link is capable of swinging around a lateral axis, with a traveling device 2 supported on the other end of the second link 27.

A plurality (four) of the drive mechanisms 4 are provided corresponding to each of the plurality of bending link mechanisms 3, and each drive mechanism 4 includes a first hydraulic cylinder 28 capable of changing the swinging posture of the first link 26 with respect to the main body 1, and a second hydraulic cylinder 29 capable of changing the swinging posture of the second link 27 with respect to the first link 26. Each drive mechanism 4 changes the posture of the corresponding bending link mechanism 3 while maintaining a state in which the first link 26 and the second link 27 in the bending link mechanism 3 bend toward the intermediate side in the front-rear direction of the vehicle body.

More specifically, as shown in FIGS. 1 to 3 and FIG. 5, on both sides at the front and rear of the main body 1, a laterally oriented support shaft 31 that extends in the lateral direction over the entire width in the lateral direction of the vehicle body is fixed, through brackets 30 (brackets 30a and 30b), to the upper connecting body 8 that connects the upper portions of the frame members 7 to each other. Among the four bending link mechanisms 3, a pivot boss portion 32 of each first link 26 in the right and left bending link mechanisms 3 located on the front side are externally fitted in a rotatable manner on the support shaft 31 on the front side. Among the four bending link mechanisms 3, a pivot boss portion 32 of each first link 26 in the right and left bending link mechanisms 3 located on the rear side are externally fitted in a rotatable manner on the support shaft 31 on the rear side.

As shown in FIGS. 1 and 2, a first bracket 33 and a second bracket 34 are provided in an integrated manner in the respective pivot boss portions 32 of the first links 26, such that the first bracket 33 and the second bracket 34 are at different positions in the circumferential direction. The first hydraulic cylinder 28 is pivotally connected across the first bracket 33 and a vehicle-side bracket 35 provided at a location spaced to the inside in the front-rear direction of the vehicle body from the support shaft 31 in the upper connecting body 8. The second hydraulic cylinder 29 is pivotally connected across the second bracket 34 and a link-side bracket 36 provided in an intermediate portion of the second link 27. Note that, in the pivot boss portion 32 supported on the support shaft 31 on the front side, the first bracket 33 and the second bracket 34 are provided in a state separated from each other in the lateral direction.

When the first hydraulic cylinder 28 is extended and contracted in a state where operation of the second hydraulic cylinder 29 has been stopped, each of the first links 26, the second links 27 and the traveling devices 2 swing in unison with each other around a lateral axis X1 of the support shaft 31. When the second hydraulic cylinder 29 is extended and contracted in a state where operation of the first hydraulic cylinder 28 has been stopped, while the posture of the first links 26 is constantly maintained, the second links 27 and the traveling devices 2 swing in unison with each other around a lateral axis X2 where the first links 26 and the second links 27 are connected (see the virtual line in FIG. 4).

As shown in FIG. 3, a first angle sensor 37 that detects the pivot angle of the first link 26 with respect to the support shaft 31 is provided on the lateral side of the pivot boss portion 32 with respect to the support shaft 31 of the first link 26. A second angle sensor 38 that detects the relative angle of the first link 26 and the second link 27 is provided in a pivot support portion where the first link 26 and the second link 27 are pivotally connected.

FIGS. 1 and 3 show a state in which, in each of the plurality of bending link mechanisms 3, the first hydraulic cylinder 28 and the second hydraulic cylinder 29 are each in their most retracted state. In other words, FIGS. 1 and 3 show a state in which all of the traveling devices 2 are closest to the main body 1 (that is, a state where the vehicle height is as low as possible).

Figure 4:
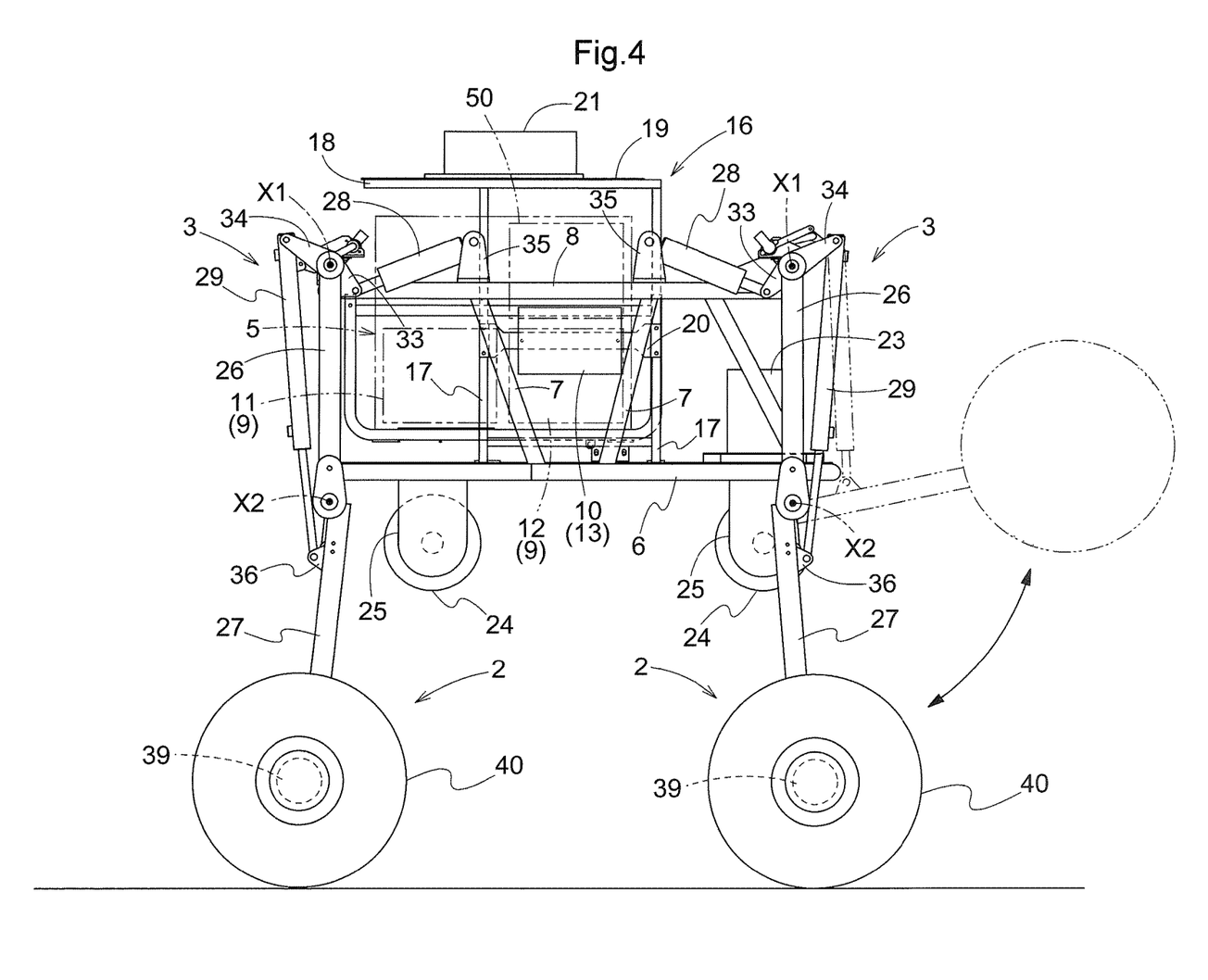
FIG. 4 shows a side view of the work vehicle in a state in which traveling devices have been lowered.
Figure 5:
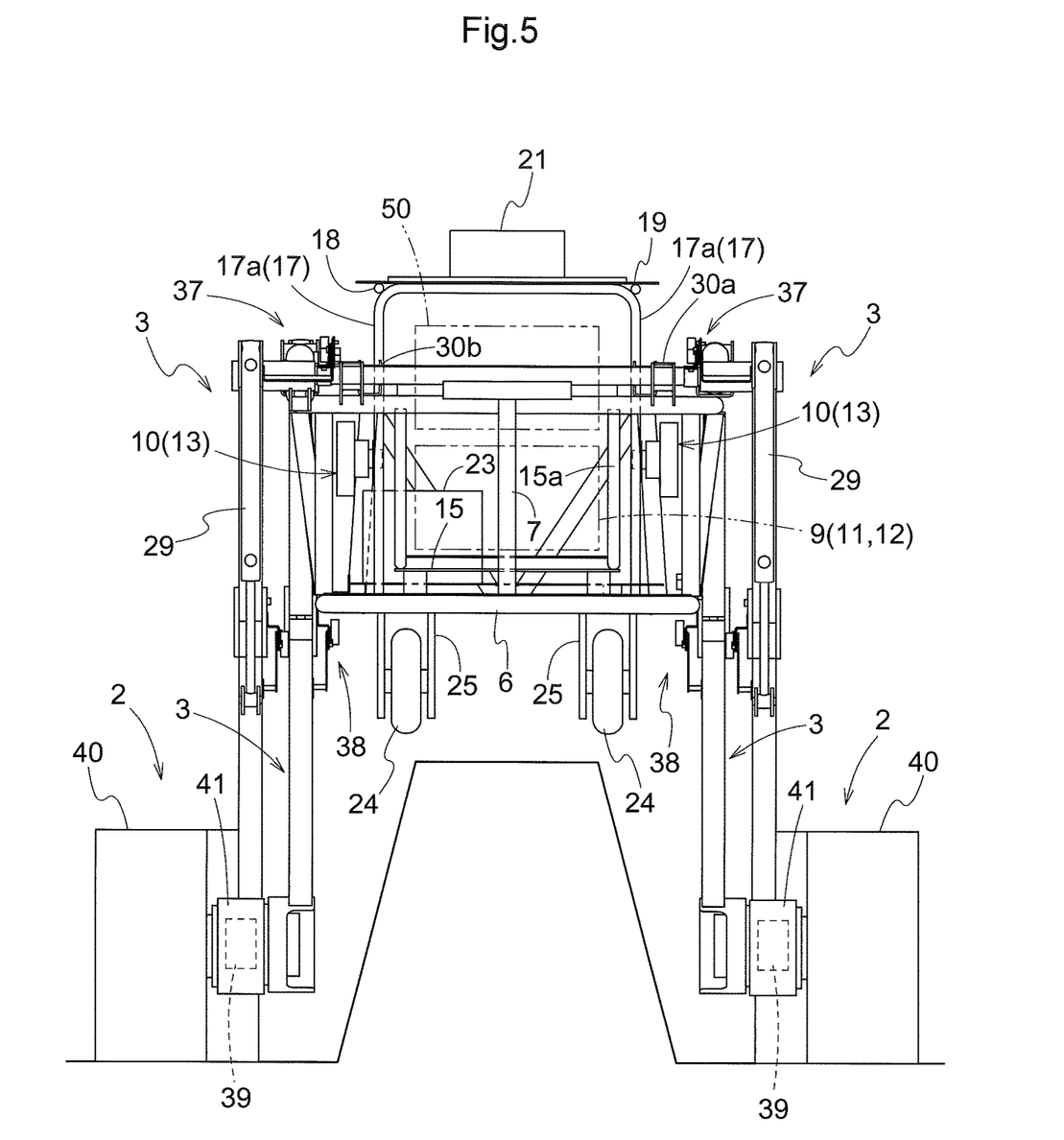
FIG. 5 shows a front view of the work vehicle in a state in which the traveling devices have been lowered.

The solid lines in FIG. 4, and FIG. 5, show a state in which, in each of the plurality of bending link mechanisms 3, the first hydraulic cylinder 28 is operated such that the first link 26 is in a vertical posture and the second hydraulic cylinder 29 is operated such that the second link 27 is in a vertical posture. In other words, the solid lines in FIG. 4, and FIG. 5, show a state in which the main body 1 is separated as much as possible from all of the traveling devices 2 (that is, a state where the vehicle height is as high as possible).

Figure 6:
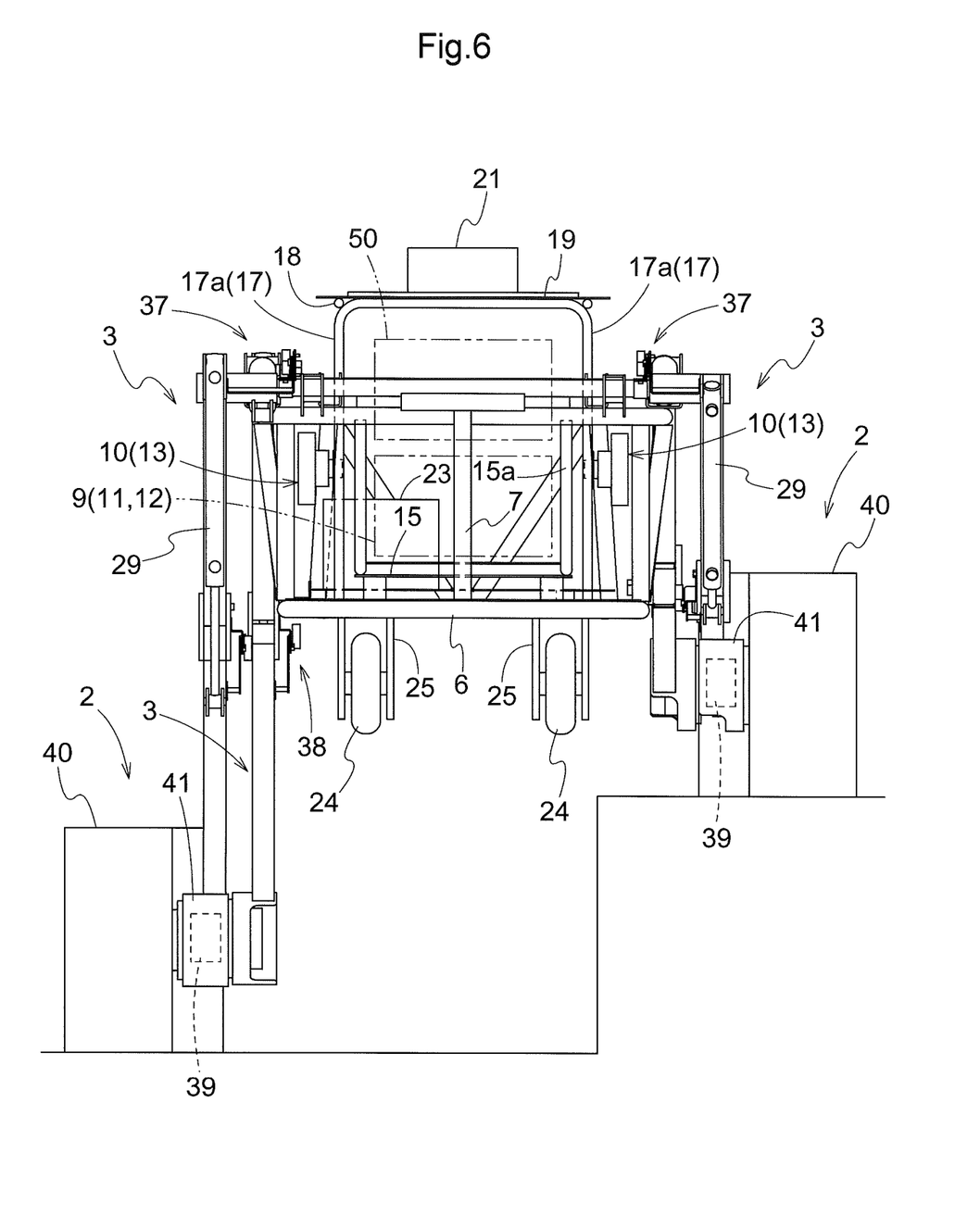
FIG. 6 shows a front view of the work vehicle in a state in which the work vehicle travels along a step.

FIG. 6 shows a state in which, in two of the bending link mechanisms 3 located on the right side, the first hydraulic cylinder 28 is operated such that the first link 26 is in a vertical posture and the second hydraulic cylinder 29 is operated such that the second link 27 is in a vertical posture, and in two of the bending link mechanisms 3 located on the left side, the first hydraulic cylinder 28 and the second hydraulic cylinder 29 are each in their most retracted state.

As shown in FIGS. 1 and 3, the second hydraulic cylinder 29 is provided across the second bracket 34, which protrudes to the outside in the front-rear direction of the vehicle body from the pivot boss portion 32, and a location to the outside in the front-rear direction of the vehicle body in the vertical posture of the second link 27. By providing the second hydraulic cylinder 29 in this way, when bending the bending link mechanism 3, a state is maintained where an intermediate bending portion 3A of the bending link mechanism 3 bends toward the intermediate side in the front-rear direction of the vehicle body.

The first hydraulic cylinder 28 and the second hydraulic cylinder 29 corresponding to each of the two bending link mechanisms 3 located on the right side of the vehicle body are connected to the valve mechanism 10 located on the right side of the vehicle body by hydraulic piping not shown. The first hydraulic cylinder 28 and the second hydraulic cylinder 29 corresponding to the two bending link mechanisms 3 located on the left side of the vehicle body are connected to the valve mechanism 10 located on the left side of the vehicle body by hydraulic piping not shown.

Hydraulic oil is supplied from the hydraulic supply source 9 to the first hydraulic cylinder 28 and the second hydraulic cylinder 29 of each of the plurality of bending link mechanisms 3 through the valve mechanism 10. The hydraulic control valve 13 provided in the valve mechanism 10 supplies and discharges the hydraulic oil, and thus the first hydraulic cylinder 28 and the second hydraulic cylinder 29 can be operated to extend and contract. The hydraulic control valve 13 is controlled by the control device 21. The control device 21 can change the bending link mechanisms 3 to a desired posture by performing control such that detection values of the first angle sensor 37 and the second angle sensor 38 reach target values.

Hydraulic motors 39 that drive the traveling devices 2 are provided individually in each of the traveling devices 2. That is, each of the four traveling devices 2 includes a wheel 40 supported so as to be capable of rotating around a lateral axis, and a hydraulic motor 39, which is built into a bearing portion 41 of the wheel 40. Each traveling device 2 can rotationally drive a wheel 40 individually by operating its hydraulic motor 39.

Each of the two hydraulic motors 39 provided in the two traveling devices 2 located on the right side of the vehicle body is connected to the valve mechanism 10 on the right side by hydraulic piping not shown, and each of the two hydraulic motors 39 provided in the two traveling devices 2 located on the left side of the vehicle body is connected to the valve mechanism 10 on the left side by hydraulic piping not shown. Hydraulic oil is supplied from the hydraulic supply source 9 to each hydraulic motor 39 through the right and left valve mechanisms 10 respectively.

It is possible to change the rotational speed of the hydraulic motor 39, that is, the wheel 40, by adjusting the flow rate of the hydraulic oil with the hydraulic control valve 13 provided in the valve mechanism 10 corresponding to the hydraulic motor 39. The hydraulic control valve 13 is controlled by the control device 21 based on control information inputted by a manual operation or control information that has been set in advance and stored, or the like.

As shown in FIG. 1, this work vehicle includes various sensors. Specifically, a first cap-side pressure sensor S1 and a first head-side pressure sensor S2 are provided in each first hydraulic cylinder 28, and a second cap-side pressure sensor S3 and a second head-side pressure sensor S4 are provided in each second hydraulic cylinder 29.

The first cap-side pressure sensor S1 detects the hydraulic pressure of a cap-side chamber of the first hydraulic cylinder 28. The first head-side pressure sensor S2 detects the hydraulic pressure of a head-side chamber on the opposite side as the cap of the first hydraulic cylinder 28.

The second cap-side pressure sensor S3 detects the hydraulic pressure of a cap-side chamber of the second hydraulic cylinder 29. The second head-side pressure sensor S4 detects the hydraulic pressure of a head-side chamber on the opposite side as the cap of the second hydraulic cylinder 29.

Note that the installation locations of the respective pressure sensors S1, S2, S3 and S4 are not limited to those described above. It is sufficient that the respective pressure sensors S1, S2, S3 and S4 are able to detect (estimate) the hydraulic pressure of the corresponding cap-side chamber or head-side chamber, and these sensors may be provided in piping between the valve mechanism 10 and the corresponding cap-side chamber or head-side chamber.

The force required to support the main body 1 is calculated based on the detection results of these sensors, and based on the results of that calculation, the supply of hydraulic oil to the first hydraulic cylinder 28 and the second hydraulic cylinder 29 respectively is controlled. Specifically, based on the detection value of the first cap-side pressure sensor S1 and the detection value of the first head-side pressure sensor S2, cylinder thrust of the first hydraulic cylinder 28 is calculated from the differential pressure between the cap-side chamber and the head-side chamber of the first hydraulic cylinder 28. Also, based on the detection value of the second cap-side pressure sensor S3 and the detection value of the second head-side pressure sensor S4, cylinder thrust of the second hydraulic cylinder 29 is calculated in the same manner as for the first hydraulic cylinder 28.

The work vehicle also includes an acceleration sensor S5. Based on the detection result of the acceleration sensor S5, inclination of the main body 1 to the front, rear, left, and right is detected, and the posture of the main body 1 is controlled based on those results. That is, the supply of hydraulic oil to the first hydraulic cylinder 28 and the second hydraulic cylinder 29 respectively is controlled such that the posture of the main body 1 becomes a target posture.

Note that the method of detecting cylinder thrust is not limited to the above-described method in which cylinder thrust is calculated by pressure sensors provided on the cap side and the head side (the side opposite to the cap). It is sufficient that cylinder thrust can be detected, and a configuration may be adopted in which cylinder thrust is detected by providing a sensor that detects force at the tip of a cylinder rod.

The work vehicle also includes rotation sensors S6 that detect the rotational speed of the hydraulic motors 39 that drive the traveling devices 2. The rotational speed of each wheel 40 is calculated based on the detection results of these rotation sensors S6. The supply of hydraulic oil to the hydraulic motors 39 is controlled based on the calculated rotational speed of the wheels 40 so that the rotational speed of the wheels 40 becomes a target value.

As described above, the traveling devices 2 are supported through the bending link mechanisms 3, and the posture of the bending link mechanisms 3 is changed by the hydraulic cylinders 28 and 29 serving as the hydraulically driven drive mechanisms 4. This configuration is not likely to be affected by moisture, fine dust, or the like, and is suitable for agricultural work.

Also, as described above, the plurality of drive mechanisms 4 are disposed distributed in the front and rear respectively on both right and left sides of the main body 1, in a state corresponding to the plurality of bending link mechanisms 3. Also, because the hydraulic oil supply device 5 is provided in the main body 1 at an intermediate position in the front-rear direction of the vehicle body, the distance from the hydraulic oil supply device 5 is equal respectively for the drive mechanisms 4 located on the front side of the vehicle and the drive mechanisms 4 located on the rear side of the vehicle. That is, the length of the hydraulic pipe for supplying hydraulic oil to each drive mechanism 4 can be made equal. As a result, variations in characteristics such as pressure, flow rate and temperature of the hydraulic oil supplied to each drive mechanism 4 can be reduced.

The drive mechanism 4 uses a large amount of hydraulic oil, and the hydraulic oil supply device 5 supplies hydraulic oil to the plurality of drive mechanisms 4, so that the hydraulic oil supply device 5 becomes a large and heavy device. Because the hydraulic oil supply device 5 having such a large size is provided in the main body 1 at an intermediate position in the front-rear direction of the vehicle, the weight balance in the front-rear direction of the overall vehicle is good, and the posture of the vehicle can be easily stabilized.

Also, as described above, the hydraulic supply source 9 is mounted on and supported by the base 6 that supports the entire vehicle in the vehicle body. The hydraulic oil fed out from the hydraulic pressure source 9 is supplied to the drive mechanisms 4 in a state where this supply is controlled by the valve mechanisms 10. Although the hydraulic supply source 9 of the hydraulic oil supply device 5 is a large device in order to feed out a large amount of hydraulic oil, this sort of hydraulic supply source 9 is mounted on and supported by a base. The base 6 is a rigid component that supports the entire vehicle, and can stably support the hydraulic supply source 9, which is a large device.

The following working mode is a usage example. For example, a work device is mounted on and supported by the main body 1, and traveling devices 2 contact the ground in passages on both right and left sides of a crop row so that work is performed while the main body 1 travels in a state straddling over the crop row. By changing the location of the main body 1 according to the growing conditions of the crop, it becomes easy to carry out work of planting the crop, work of spreading fertilizers and drugs and the like, and work of harvesting after growing, and the like (see FIG. 6).

It is also possible to travel in a state in which the vehicle contacts the ground on both right and left sides in a location where large steps exist. Furthermore, because the four bending link mechanisms 3 can bend individually, it is possible to move by the traveling devices 2 climbing over the steps one by one, and thus it is possible to climb over the steps by autonomous traveling.

Other Embodiments (1) In the above embodiment, a configuration is adopted in which the bending link mechanisms 3 are supported on the frame members 7 that extend upward from the base 6, but instead of this configuration, a configuration may be adopted in which the bending link mechanisms 3 are directly supported on the base 6, or a configuration may be adopted in which the bending link mechanisms 3 are supported on a frame member that extends downward from the base 6.

(2) In the above embodiment, a configuration is adopted in which each drive mechanism 4 includes the first hydraulic cylinder 28 and the second hydraulic cylinder 29, but instead of this configuration, a configuration may be adopted in which a hydraulic motor is provided at the swing fulcrum of each bending link mechanism 3, and the posture of each bending link mechanism 3 is changed by the hydraulic motors.

(3) In the above embodiment, a configuration is adopted in which the auxiliary wheels 24 are supported so as to be freely rotatable. However, a configuration may be adopted in which the auxiliary wheels 24 are rotationally driven, or a configuration may be adopted in which such auxiliary wheels 24 are not provided.

(4) In the above embodiment, a configuration is adopted in which the traveling devices 2 are driven by the hydraulic motors 39, but instead of this configuration, a configuration may be adopted in which, for example, the power of the engine 11 is supplied to the wheels 40 through a mechanical transmission mechanism such as a chain transmission mechanism.

(5) In the above embodiment, a configuration is adopted in which each traveling device 2 includes one wheel 40, but instead of this configuration, a configuration may be adopted in which a crawler traveling device in which a crawler belt is wound around a plurality of wheels is used as a traveling device.

(6) In the above embodiment, a configuration is adopted in which the hydraulic oil supply device 5 is provided in the main body 1 at an intermediate position in the front-rear direction of the vehicle body, but the present invention is not limited to this configuration. For example, the hydraulic oil supply device 5 can also be provided somewhere other than an intermediate position in the front-rear direction of the vehicle body, between the link mechanisms 3 on the front side in the front-rear direction of the vehicle body and the link mechanisms 3 on the rear side in the front-rear direction of the vehicle body.

(7) In the above embodiment, the bending link mechanisms 3 are supported on an upper portion of the main body 1, in other words, supported on an upper portion of the frame members 7. In this case, the location where the link mechanisms 3 are connected to the main body 1 is set to a high location in the main body 1. Because the main body 1 is supported through the link mechanisms 3 at a high location, the location of the center of gravity is set as low as possible relative to the support location of the main body 1 in order to make it possible to improve posture stability. However, the support location of the link mechanisms is not limited to the above configuration, and may be, for example, in an intermediate portion or a lower portion of the main body 1. When the link mechanisms 3 are supported on a lower portion of the main body 1, the height of the vehicle can be increased, and therefore it becomes possible to climb over or straddle higher obstacles.

(8) In the above embodiment, a configuration is adopted in which the control device 21 is supported on the upper portion of the support base 16, and the valve mechanisms 10 are supported on the upper-lower intermediate portions of the support base 16. However, instead of this configuration, a configuration may be adopted in which the control device 21 and the valve mechanisms 10 are each supported on the base 6.

(9) In the above embodiment, a configuration is adopted in which a state is maintained in which the intermediate bending portions 3A of the bending link mechanisms 3 bend toward the intermediate side in the front-rear direction of the vehicle body. However, instead of this configuration, a configuration may be adopted in which the intermediate bending portions 3A bend toward the outside in the front-rear direction of the vehicle body.

INDUSTRIAL APPLICABILITY

The present invention is applicable to an agricultural work vehicle.

DESCRIPTION OF REFERENCE NUMERALS/MARKS

- 1: vehicle body (main body)
- 2: traveling device
- 3: bending link mechanism (raising/lowering support mechanism)
- 3A: intermediate bending portion
- 4: drive mechanism
- 5: hydraulic oil supply device
- 6: base
- 7: frame member
- 9: hydraulic supply source
- 10: valve mechanism
- 11: engine (power device that drives hydraulic pump)
- 12: hydraulic pump
- 16: support base
- 21: control device
- 24: auxiliary wheel
- 26: first link
- 27: second link
- 28: first hydraulic cylinder
- 29: second hydraulic cylinder
- 39: hydraulic motor
- X1: lateral axis
- X2: lateral axis

What is claimed is:

1. A work vehicle, comprising:
a vehicle body;
a plurality of traveling devices located on both right and left sides of the vehicle body;
a plurality of bending link mechanisms that support the respective traveling devices on the vehicle body such that the traveling devices can be individually raised or lowered; and
a plurality of drive mechanisms capable of individually changing posture of the bending link mechanisms;
wherein the drive mechanisms are able to change the posture of the bending link mechanisms while maintaining a state in which intermediate bending portions of the bending link mechanisms bend toward an intermediate side in a front-rear direction of the vehicle body,
each of the bending link mechanisms includes a first link having one end supported on the vehicle body such that the first link is capable of swinging around a lateral axis, and a second link having one end supported on the other end of the first link such that the second link is capable of swinging around a lateral axis, with the traveling device supported on the other end of the second link,
each of the drive mechanisms includes a first cylinder capable of changing the swinging posture of the first link with respect to the vehicle body, and a second cylinder capable of changing the swinging posture of the second link with respect to the first link, and
each of the drive mechanisms changes the posture of the bending link mechanism while maintaining a state in which the first link and the second link in the bending link mechanism bend toward the intermediate side in the front-rear direction of the vehicle body.

2. The work vehicle according to claim 1,
wherein the drive mechanisms are hydraulically driven drive mechanisms.

3. The work vehicle according to claim 2,
wherein in the vehicle body, there is provided a hydraulic supply source that feeds out hydraulic oil toward the plurality of drive mechanisms, and
the hydraulic supply source is mounted on and supported by a base that supports the entire vehicle in the vehicle body.

4. The work vehicle according to claim 1,
wherein hydraulic motors that drive the traveling devices are provided individually in the traveling devices.

5. The work vehicle according to claim 1,
wherein a plurality of auxiliary wheels are provided in a lower portion of the vehicle body.

6. The work vehicle according to claim 1,
wherein the traveling devices and the drive mechanisms are hydraulically driven,
the work vehicle including a hydraulic supply source that feeds out hydraulic oil toward the traveling devices and the drive mechanisms, and
a valve mechanism that controls hydraulic oil supplied from the hydraulic supply source to the drive mechanisms.

7. The work vehicle according to claim 6,
wherein the hydraulic supply source includes a hydraulic pump and a power device that drives the hydraulic pump.

8. The work vehicle according to claim 6,
wherein hydraulic motors that drive the traveling devices are provided individually in the traveling devices.

9. The work vehicle according to claim 6,
wherein the vehicle body includes a support base that extends upward from a base so as to straddle the hydraulic supply source, and a control device that controls operation of the valve mechanism,
the control device being supported on an upper portion of the support base, and the valve mechanism being supported on upper-lower intermediate portions of the support base.

10. A hydraulic robot, comprising:
a main body;
a plurality of hydraulically driven traveling devices located on both right and left sides of the main body;

a plurality of raising/lowering support mechanisms that support the respective traveling devices on the main body such that the traveling devices can be individually raised or lowered;

a plurality of hydraulically driven drive mechanisms capable of individually changing posture of the raising/lowering support mechanisms;

a hydraulic supply source that feeds out hydraulic oil toward the traveling devices and the drive mechanisms; and a valve mechanism that controls hydraulic oil supplied from the hydraulic supply source to the drive mechanisms.

11. The hydraulic robot according to claim 10, wherein the hydraulic supply source includes a hydraulic pump and a power device that drives the hydraulic pump.

12. The hydraulic robot according to claim 10, wherein hydraulic motors that drive the traveling devices are provided individually in the traveling devices.

13. The hydraulic robot according to claim 10, wherein the main body includes a support base that extends upward from a base so as to straddle the hydraulic supply source, and a control device that controls operation of the valve mechanism, the control device being supported on an upper portion of the support base, and the valve mechanism being supported on upper-lower intermediate portions of the support base.

14. The hydraulic robot according to claim 10, wherein the raising/lowering support mechanisms are bending link mechanisms.

15. The hydraulic robot according to claim 14, wherein each of the bending link mechanisms includes a first link having one end supported on the main body such that the first link is capable of swinging around a lateral axis, and a second link having one end supported on the other end of the first link such that the second link is capable of swinging around a lateral axis, with the traveling device supported on the other end of the second link, and each of the drive mechanisms includes a first hydraulic cylinder capable of changing the swinging posture of the first link with respect to the main body, and a second hydraulic cylinder capable of changing the swinging posture of the second link with respect to the first link.

\* \* \* \* \*